Dec. 29, 1970 C. A. CARLSON 3,551,111
REACTION-EXTRACTION AND ANALYSIS CHAMBER AND RELATED EQUIPMENT
Filed March 28, 1968
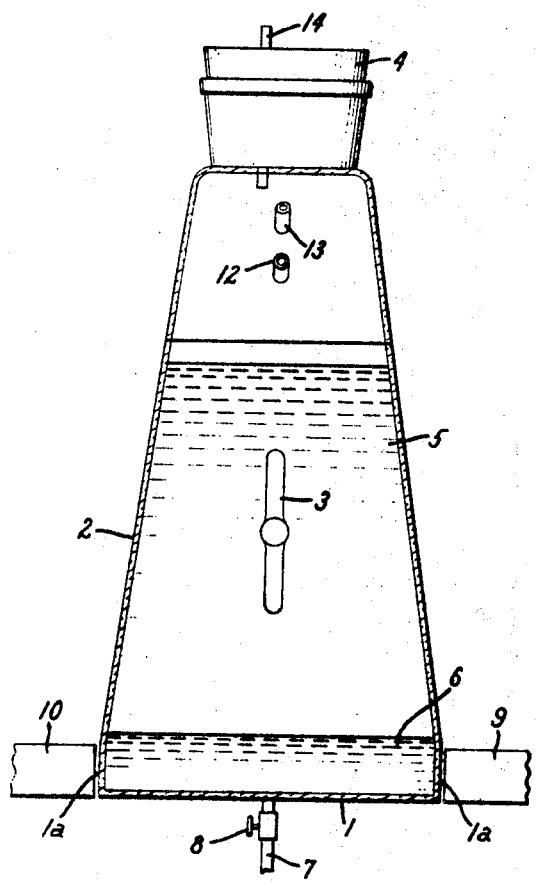
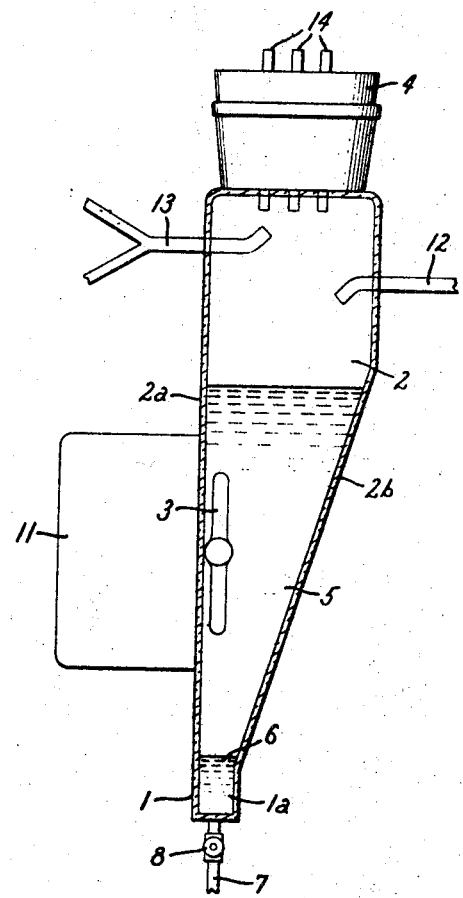
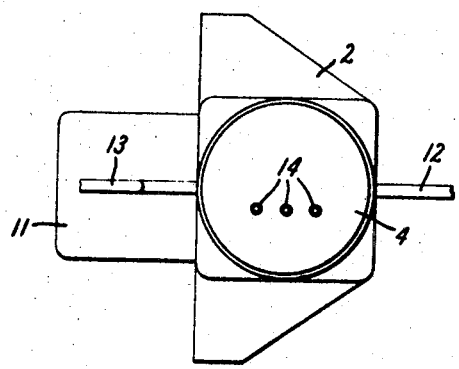
INVENTOR:
CLARENCE A. CARLSON,
BY
ATTORNEY United States Patent Office 3,551,111
Patented Dec. 29, 1970

3,551,111
REACTION-EXTRACTION AND ANALYSIS
CHAMBER AND RELATED EQUIPMENT
Clarence A. Carlson, Norristown, Pa., assignor to General
Electric Company, a corporation of New York
Filed Mar. 28, 1968, Ser. No. 716,949
Int. Cl. B01l 3/08; G01n 21/24
U.S. Cl. 23—253
5 Claims

ABSTRACT OF THE DISCLOSURE

A reaction-extraction and analysis chamber, which facilitates the photometric analysis of a relatively heavy fluid phase formed in preliminary reaction and extraction stages, comprises a bottom segment having spaced, transparent walls adapted for use with a photometric analyzer, and an upper segment, including agitating means, which opens into the bottom segment. With the addition of sequencing-controlling means and/or metering means, automated or semi-automated forms of the invention are obtained.

INTRODUCTION

This invention pertains to apparatus for multi-stage processes including photometric analysis and particularly to such apparatus adapted for automated or semi-automated operation.

BACKGROUND OF THE INVENTION

To enhance the photometric sensitivity of some chemical systems, a light-absorbing reaction product, which constitutes only a small part of a reaction mass, is sometimes extracted from the reaction mass. This requires an immiscible extractant phase in which the light-absorbing product is preferentially soluble. By the use of a small volume of extractant, relative to the volume of the reaction mass, the light-absorbing product is concentrated and the photometric response to it is proportionally increased. Such processes characteristically include three distinct stages: reaction, extraction and analysis.

An example of such a process is the method of analyzing water for phenol content wherein 4-aminoantipyrine and a ferricyanide reagent are reacted with the phenol-containing water at a pH of about 8 to form a quinoid dye. This dye can be extracted from a relatively large volume of the aqueous reaction mixture with a relatively small volume of chloroform. (Excess 4-aminoantipyrine reagent is prevented from partitioning to the chloroform extractant by lowering the pH of the aqueous phase to about 3 prior to adding the chloroform. This reduces reagent blank absorption but does not significantly alter the quinoid dye absorption.) The chloroform dye phase is then separated and photometrically analyzed. Because of the sensitivity of this process, it is particularly useful for the analysis of potable water supply systems subject to possible phenol contamination. The maximum acceptable phenol concentration in potable water, as set by the United States Department of Health, is 1 part per billion.

Heretofore, analytical procedures, requiring a fluid phase reaction, extraction and photometric analysis, such as that for phenol described above, have been difficult and time consuming. The variety of reagents and pieces of apparatus necessary for such a three-stage process is a severe handicap especially if the analysis must be repeated often.

In view of these problems, it is an object of the present invention to provide means for facilitating the preparation for and accomplishment of the photometric analysis of certain chemical systems.

It is another object of this invention to provide improved apparatus for the photometric quantitative determination of phenol in water.

Still another object of this invention is to provide automated means for carrying out sequential chemical reaction, extraction and photo-analytical processes.

BRIEF DESCRIPTION OF THE INVENTION

These and other objects are met, in accordance with the present invention by a chamber, the lower segment of which comprises an optical cell and the upper segment of which comprises a chemical reaction and extraction space. A drain at the bottom of the lower chamber segment is provided to facilitate removal of the extractant, reaction mass, wash fluids, etc. from the apparatus. The upper chamber segment includes means for stirring the reaction mass therein. Preferably the upper segment includes a vertically disposed wall on which is mounted a magnetic stirrer or "flea."

Also provided in the preferred embodiment of the present invention are means for discharging preselected volumes of reagents and test fluids into the apparatus. Automatic control means may be provided for sequentially discharging the reagents and fluids into the apparatus, operating the magnetic stirrer, conducting the photometric analysis, draining the reaction mass from the apparatus, and washing at the conclusion of the process.

DETAILED DESCRIPTION OF THE INVENTION

While the specification concludes with claims particularly pointing out and distinctly claiming the subject matter of the present invention, this invention may be better understood from the following description, taken in conjunction with the following drawings, in which:

FIG. 1 is a front view of apparatus, including a two segment chamber, which comprises the preferred embodiment of the present invention;

FIG. 2 is a side view of apparatus including the chamber shown in FIG. 1; and

FIG. 3 is a top view of the apparatus shown in FIG. 2.

Referring more specifically to FIG. 1 there is shown a glass chamber comprised of photometric analysis chamber segment 1 and reaction-extraction chamber segment 2, disposed above and opening into analysis segment 1. Analysis segment 1 includes a pair of transparent walls 1a disposed parallel to and at a distance from one another so that the light-absorption characteristics of a fluid contained in analysis segment 1 between transparent walls 1a may be measured and/or recorded. An agitating means 3, a stopper 4 disposed at the top of reaction-extraction chamber segment 2, a fluid reaction mass 5 including a relatively heavy immisible phase 6, a drain 7, a drain valve 8 and photometric analyzer elements 9 and 10 representing, schematically, the light source and receiver thereof of a conventional photometric analyzer, are also shown in FIG. 1.

As described more particularly hereinafter, the chamber comprised of segments 1 and 2 shown in FIG. 1 is peculiarly adapted to serve as a combined fluid reaction and phase separation vessel and photometric analysis for a color analyzable relatively heavy fluid phase which separates from the reaction mass in the chamber.

FIG. 2, which is a side view of the chamber, comprised of segments 1 and 2, shown in FIG. 1 also includes, schematically, a magnetic actuator 11 for agitating means 3, sample and wash fluid inlet lines 12 and 13 respectively, and reagent inlet lines 14.

Both analysis segment 1 and reaction-extraction segment 2 are generally rectangular in horizontal cross section. To facilitate reaction and extraction in segment 2, one of the long sides of the rectangular cross section of reaction-extraction segment 2 comprises a vertical wall 2a while the opposite long side 2b is non-vertical and diverges, upwardly, away from vertical wall 2a. Magnetic actuator 11 and agitating means 3, a magnetic "flea," are mounted on vertical wall 2a of chamber segment 2.

FIG. 3 is a top view of the apparatus shown in FIG. 2.

The use of the apparatus illustrated in FIGS. 1–3, which as indicated above comprises the preferred embodiment of the present invention, may best be described by reference to the utilization of the apparatus in a phenol analysis process such as that described with respect to the background of the present invention.

Specifically, 100 milliliters of water, to be analyzed for phenol, is introduced into the chamber through inlet line 12 and agitator 3 is activated by magnetic stirrer 11. One milliliter of 4-aminoantipyrine buffered to pH 8, with a buffer solution comprising a 0.6 mole solution of tris-(hydroxymethyl)amino methane adjusted to pH 8 by the addition of hydrochloric acid, is then added through one of the reagent inlet lines 14. About 15 seconds later, 1 milliliter of potassium ferricyanide, also buffered to pH 8 with the buffer solution previously described, is added through another one of the inlet lines 14. After about 1 minute, the pH of the reaction mass is lowered to about 3 by the addition of 1 milliliter of 2.5 mole tartaric acid, adjusted to pH 2 with the previously described buffer solution.

After allowing about 30 seconds for these reagents to approach the equilibrium stage, 10 milliliters of chloroform is discharged into the chamber through another one of the inlet lines 14. The stirring action is discontinued about 2 minutes later. The chloroform phase, with the quinoid dye selectively dissolved therein, then settles to the bottom of the chamber and occupies photometric analysis segment 1.

Photometric analysis may then proceed forthwith. Photometric analyzer elements 9 and 10 are activated for this purpose and the light absorption characteristics of the chloroform-dye phase are observed and/or recorded.

Drain valve 8 is then opened and the apparatus is cleansed by the alternate introduction of acetone and distilled water through wash linet inlets 13. With drain valvet 8 closed, the process may be repeated.

Phenol concentrations on the order of 1 part per billion have been quantitated using this process with the apparatus described.

The apparatus of the present invention reduces considerably the time required to perform the analysis described above and improves the precision and accuracy of the analysis by eliminating the possibility of contamination or loss of material occurring in the transfer of materials into the various vessels heretofore required. Still another and perhaps less obvious advantage of the basic apparatus, however, is its adaptability to automatic processes as illustrated by the semi-automated and fully automated embodiments of the present invention.

In the semi-automated form of the present invention, sample inlet line 12 and reagent inlet lines 14 are connected to the respective sources of the sample and reagents with metering means, such as syringes, interposed in the inlet lines between the apparatus and the sources. The syringes used are all of conventional medical types and are selected or adjusted so that their volume corresponds to the volume of the particular material required to be discharged into the apparatus for the proper operation thereof. Thus preselected quantities of the sample and of the reagents are easily discharged into the apparatus in the desired sequence.

The apparatus shown may be fully automated by the inclusion of pneumatic or electrical actuators for the syringes described above, for valves controlling the wash water and acetone entering inlet 13 and for the drain valve 8. A continuous recording means connected to the photometric analyzer and a time sequencing means controlling the operation of these various actuating means and the agitating means 11, so that the various actuating means are each operated in the proper sequence and for the proper interval, complete the automated apparatus. This fully automated embodiment of the present invention is particularly adapted for use in remote locations, for continuous repetitive operation and in circumstances where the amount of operator time required must be minimized.

While the present invention has been described with reference to particular embodiments thereof for purposes of clarity and convenience, it should be understood that numerous modifications may be made by those skilled in the art without departing from the invention's true spirit and scope. Therefore the appended claims are intended to cover all such equivalent variations as come within the true spirit and scope of the present invention.

What I claim as new and desire to secure by Letters Patent of the United States is:

1. Apparatus including a chamber for containing a multiple phase fluid comprising:
   (I) a first chamber segment at the bottom thereof for containing the heaviest phase of said fluid said first segment having a pair of opposed planar transparent walls disposed at a distance from one another,
   (II) a second chamber segment disposed above and opening into said first chamber segment said second chamber segment also including a fluid mixing means, and
   (III) means for photometrically analyzing the fluid in said first chamber segment, said means including a light source and a receiver located adjacent said transparent walls, said chamber being adapted to serve as a combined fluid reaction and phase separation vessel and a photometric analysis cell for a color analyzable relatively heavy fluid phase which separates from a reaction mass in said chamber.

2. Apparatus, as recited in claim 1, wherein the horizontal cross section of both of said chamber segments is generally rectangular.

3. Apparatus, as recited in claim 1, wherein said second chamber segment includes a vertically disposed flat wall and said fluid mixing means comprises a magnetic stirrer disposed thereon.

4. Apparatus, as recited in claim 1, wherein said chamber is generally rectangular in horizontal cross section, said second chamber segment including a vertical wall comprising one of the long sides of said rectangular cross section and a non-vertical wall comprising the other of the long sides of said rectangular cross section, said non-vertical wall diverging upwardly away from said vertical wall, and wherein said mixing means comprises a magnetic stirrer mounted on said vertical wall.

5. Apparatus, as recited in claim 1, including means for draining fluid from said chamber.

References Cited

UNITED STATES PATENTS

| | | | |
|---|---|---|---|
| 2,990,339 | 6/1961 | Frank et al. | 23—253X |
| 3,134,649 | 5/1964 | Staunton et al. | 23—253 |
| 3,453,082 | 7/1969 | Natelson | 23—259X |

MORRIS O. WOLK, Primary Examiner

R. M. REESE, Assistant Examiner